(12) United States Patent
Keskula et al.

(10) Patent No.: US 6,790,548 B2
(45) Date of Patent: Sep. 14, 2004

(54) STAGED VENTING OF FUEL CELL SYSTEM DURING RAPID SHUTDOWN

(75) Inventors: Donald H. Keskula, Webster, NY (US); Tien M. Doan, Columbia, MD (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 346 days.

(21) Appl. No.: 10/115,643

(22) Filed: Apr. 3, 2002

(65) Prior Publication Data

US 2002/0110710 A1 Aug. 15, 2002

Related U.S. Application Data

(62) Division of application No. 09/502,640, filed on Feb. 11, 2000, now Pat. No. 6,395,414.

(51) Int. Cl.[7] .......................... H01M 8/12; H01M 8/04; H01M 2/14; B23H 3/02; F16K 31/02
(52) U.S. Cl. .............................. 429/22; 429/23; 429/17; 429/38; 251/129.04; 251/210; 204/229.4; 204/228.3
(58) Field of Search ............................. 429/22, 23, 25, 429/19, 17, 26, 34, 71, 83, 82; 251/129.04, 149, 149.8, 205, 210, 290; 204/229.4, 228.5, 228.4, 228.3, 196.13, 196.05, 409; 340/523, 526, 635

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,473,622 A | 9/1984 | Chludzinski et al. |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |

(List continued on next page.)

FOREIGN PATENT DOCUMENTS

WO    WO 09/08771    3/1998

OTHER PUBLICATIONS

Szaniszlo, "The Advanced Low–Emissions Catalytic–Combustor Program: Phase I—Description and Status," ASME #79–GT–192, Mar. 1979.
Krill et al., "Catalytic Combustion for System Applications," ASME #79–HT–54, Aug. 1979.
Hall et al., "A Porous Media Burner for Reforming Methanol for Fuel Cell Powered Electric Vehicles," SAE Paper #950095, Mar. 1995.
Naturla Gas Power Plant System (a descriptive drawing) no date available.

* cited by examiner

Primary Examiner—Raymond Alejandro
(74) Attorney, Agent, or Firm—Cary W. Brooks, Esq.; Linda M. Deschere, Esq.

(57) ABSTRACT

A venting methodology and system for rapid shutdown of a fuel cell apparatus of the type used in a vehicle propulsion system. $H_2$ and air flows to the fuel cell stack are slowly bypassed to the combustor upon receipt of a rapid shutdown command. The bypass occurs over a period of time (for example one to five seconds) using conveniently-sized bypass valves. Upon receipt of the rapid shutdown command, the anode inlet of the fuel cell stack is instantaneously vented to a remote vent to remove all $H_2$ from the stack. Airflow to the cathode inlet of the fuel cell stack gradually diminishes over the bypass period, and when the airflow bypass is complete the cathode inlet is also instantaneously vented to a remote vent to eliminate pressure differentials across the stack.

2 Claims, 6 Drawing Sheets

U.S. PATENT DOCUMENTS

| | | | |
|---|---|---|---|
| 4,678,723 A | 7/1987 | Wertheim | |
| 4,816,353 A | 3/1989 | Wertheim et al. | |
| 4,838,020 A * | 6/1989 | Fujitsuka | 60/784 |
| 4,923,768 A | 5/1990 | Kaneko et al. | |
| 4,965,143 A | 10/1990 | Mizuno et al. | |
| 4,994,331 A | 2/1991 | Cohen | |
| 5,248,567 A | 9/1993 | Amemiya et al. | |
| 5,271,916 A | 12/1993 | Vanderborgh et al. | |
| 5,272,017 A | 12/1993 | Swathirajan et al. | |
| 5,316,871 A | 5/1994 | Swathirajan et al. | |
| 5,484,577 A | 1/1996 | Buswell et al. | |
| 5,518,705 A | 5/1996 | Buswell et al. | |
| 5,554,453 A | 9/1996 | Steinfeld et al. | |
| 5,605,770 A | 2/1997 | Andreoli et al. | |
| 5,637,415 A | 6/1997 | Meltser | |
| 5,702,838 A | 12/1997 | Yasumoto et al. | |
| 5,763,113 A | 6/1998 | Meltser et al. | |
| 6,127,057 A * | 10/2000 | Gorman | 429/25 |
| 6,159,626 A | 12/2000 | Keskula et al. | |
| 6,331,366 B1 * | 12/2001 | Van Dine et al. | 429/17 |
| 6,416,891 B1 * | 7/2002 | Condit et al. | 429/13 |

STAGED VENTING OF FUEL CELL SYSTEM DURING RAPID SHUTDOWN

CROSS REFERENCE TO RELATED APPLICATION

The present application is a divisional of U.S. patent application Ser. No. 09/502,640 filed Feb. 11, 2000, now U.S. Pat. No. 6,395,414.

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997 now U.S. Pat. Nos. 6,332,005 and 6,077,620, respectively, and U.S. Ser. No. 09/187,125, filed in November, 1998 now U.S. Pat. No. 6,238,815 and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control gas flows ($H_2$ reformate and air/oxygen) to the fuel cell stack not only during start-up and normal system operation, but also during system shutdown. During the shutdown of a fuel cell system that generates hydrogen from liquid fuel, the anode CO emissions increase and can degrade the stack. Accordingly, a primary concern during shutdown is diverting the gas flows of $H_2$ and air/oxygen around or away from the fuel cell stack and disposing of the excess $H_2$. The $H_2$ and air flows being diverted from the stack during shutdown must also be kept separate to avoid creating a combustible mixture in the system. The stack must also be protected from prolonged (e.g., greater than five seconds) pressure differentials which could rupture the thin membranes in the membrane electrode assembly (MEA) separating the anode and cathode gases.

Fuel cell systems, in particular those used in vehicular applications, are often used to generate start-up and transient heat for the fuel processor. The combustor is fueled by the anode and cathode effluents, supplemental hydrocarbon fuel for start-up and high demand situations, and excess $H_2$ from the fuel processor. The combustor is also useful for burning off residual stack effluents and processor $H_2$ during system shut-down. During normal system operation, the combustor typically runs at a constant temperature, for example around 600° Celsius in an exemplary vehicle propulsion system application. It is important at all times to prevent the combustor from overheating, as the resulting degradation would require an expensive replacement and would interfere with the operation of the system as a whole. The combustor therefore generally receives a continuous air flow from the system air supply. Air flow to the combustor must be maintained during shutdown to prevent overheating as the combustor burns off residual gases.

The cooling of the combustor therefore competes with the shutdown objectives of gas flow diversion and residual $H_2$ combustion. Especially where the air supply to the system generally supplies both the combustor and the cathode inlet of the fuel cell stack, the diversion and venting of air from the cathode inlet must not even temporarily deprive the combustor of sufficient airflow for cooldown.

During normal shutdown of the system in which time is not a factor, the competing demands of gas flow diversion and combustor cooldown are relatively easy to offset and satisfy. However, during rapid shutdown, carbon monoxide emissions at the stack anode and pressure differentials at the cathode need to be dissipated in a few seconds. At the same time, sufficient air flow must be maintained to the combustor for the lengthier cooldown period. The coordinated diversion and venting of the gas flows with respect to both the fuel cell stack and combustor becomes difficult.

SUMMARY OF THE INVENTION

In one aspect, the invention provides a venting methodology for staging the diversion and venting of reformate $H_2$ and air relative to the fuel cell stack, the combustor, and one or more vents. This staged venting protects the stack from degradation due to CO and due to high pressure differentials, and protects the combustor from overheating. In another aspect, the invention further provides a currently-preferred valving and control scheme for carrying out the venting methodology.

In a fuel cell system in which the fuel cell stack and the combustor are supplied with $H_2$ and air, respectively, by a common $H_2$ supply and a common air supply, and each of the $H_2$ supply and air supply is provided with a bypass valve which supplies both the stack and the combustor during normal system operation but which bypasses the stack to the combustor during shutdown, the stack anode inlet is instantaneously vented as the bypass valves are commanded to close. The air flow ratio is slowly shifted between the cathode inlet and the combustor by the air supply bypass valve until the air flows almost entirely to the combustor. The cathode inlet is vented at a point during the air flow ratio shift at which venting will not significantly affect the flow of cooling air to the combustor, but before the pressure differential between the cathode and anode inlets can degrade the membranes in the stack.

According to another feature of the invention methodology, the $H_2$ supply path to the combustor is vented simultaneously with the stack anode inlet.

According to another feature of the invention methodology, the $H_2$ from the anode inlet and the air from the cathode inlet are vented through separate vents to prevent the creation of a combustible mixture in the system. Both of the $H_2$ and air vents preferably vent to atmosphere although other arrangements (adsorbers, holding tanks) might be useful for certain applications.

According to another aspect of the invention, the invention methodology is carried out by fast-acting vent valves provided in the flow path of the $H_2$ bypass valve to the anode inlet; in the $H_2$ supply path from the $H_2$ bypass valve to the combustor; and in the air supply path between the air bypass valve and the cathode inlet. The vent valving for carrying out the invention methodology may comprise existing valves and a fuel cell system controlled according to the invention methodology during a rapid shutdown, or may comprise single-purpose valving added to an existing fuel cell system. Control of the vent valving can be through a dedicated controller comprising any suitable microprocessor, microcontroller, personal computer, etc. which has a central processing unit capable of executing a control program and data stored in the memory. The controller may additionally comprise an existing controller in a fuel cell system.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

The present invention methodology and apparatus for venting a fuel cell system during rapid shutdown provides a staged venting and diversion of gas flows to permit adequate combustor cooldown without damaging the fuel cell stack.

The invention is particularly useful for fuel cell systems used to produce power for vehicle propulsion. This may be further understood with reference to the fuel cell system shown in FIG. 1 by way of example only. Therefore, before further describing the invention, it is useful to understand the type of system within which the staged venting methodology can be employed to protect the stack and combustor, and further to illustrate the location and interplay of existing vent valving in such a system.

Figure 1:
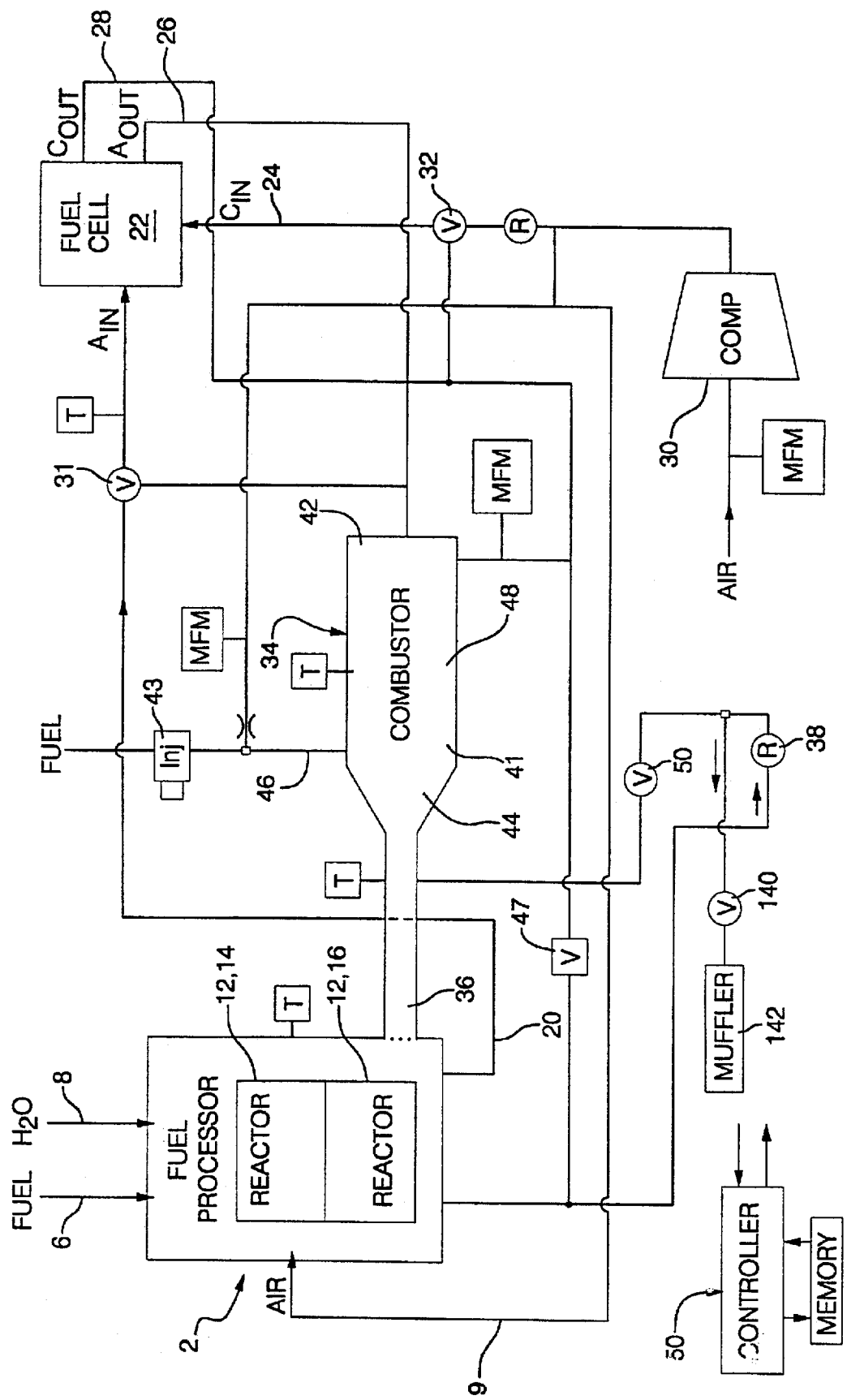
FIG. 1 is a drawing depicting a fuel cell system to which the staged venting methodology and a preferred venting arrangement according to the present invention can be applied.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to "$H_2$" as hydrogen-rich or having a relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, $H_2$ rich reformate 20 is fed through valve 31 into the anode chamber of a fuel cell stack 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat to be added. This is typically accomplished by preheating the reactants (fuel 6, steam 8, and air 9) and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 140 and a muffler 142 before being released to the atmosphere. In FIG. 1, the symbols are as follows: V is valve, MFM is mass flow meter, T is temperature monitor, R is regulator, C is cathode side, A is anode side of fuel cell, INJ is injector, and COMP is compressor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout (26) to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has a central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
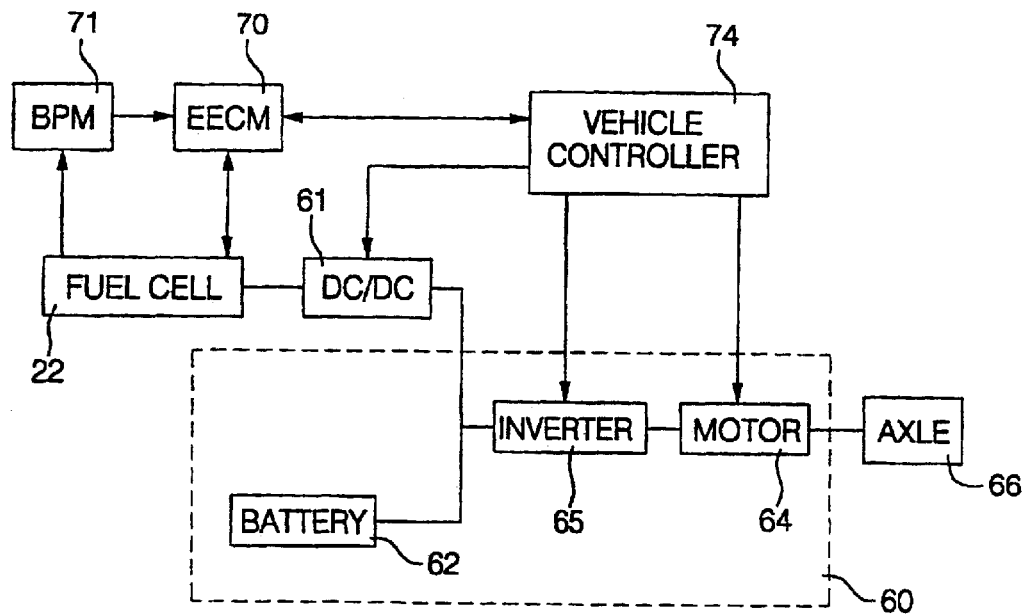
FIG. 2 is a drawing of the fuel cell system shown in FIG. 1 connected in a pictorial representation of a use application.

In a preferred embodiment, the fuel cell system uses the fuel cell 22 as part of a vehicle propulsion system (see FIG. 2). Here, a portion of the propulsion system 60 comprises a battery 62, an electric motor 64, and associated drive electronics in the form of an inverter 65, constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the inverter 65, the DC/DC converter 61, and requests a power level from the EECM 70.

The gas flows ($H_2$ and air) to the fuel cell 22 and combustor 34 in the fuel cell system of FIG. 1 have been described for a start-up mode and a run mode. Such systems also have a shutdown mode in which the gas flows to the fuel cell 22 are diverted and finally terminated, for example when a vehicle using the fuel cell system for propulsion is turned off. This diversion and termination of gas flow is accomplished through previously-illustrated valves 31 and 32 for the $H_2$ and air flows, respectively. In the illustrated system for vehicle propulsion, valves 31 and 32 typically take the form of automotive type bypass valves, usually solenoid-operated ball valves with a pipe diameter of around 1 to 1½ inches. These are generally three-way valves (one input, two possible outputs) whose function includes bypassing the flow of $H_2$ and air from fuel cell 22 to combustor 34 during shutdown.

Air flow to the combustor through valve 32 prevents the combustor from overheating as it burns off residual $H_2$ bypassed from valve 31 and effluent tapered off from the anode outlet of fuel cell 22. Continued air flow then promotes cooldown of the combustor after all residual $H_2$ has been burned off. A typical operating temperature for a combustor used in a fuel cell apparatus of the type illustrated in FIG. 1 is 600° C. Overheating can degrade the combustor, requiring expensive repairs or replacement. Accordingly, providing sufficient air flow to the combustor during shutdown, both to maintain a constant temperature for residual burn off and then for combustor cooldown, must be given a priority during the shutdown procedure.

Figure 2A:
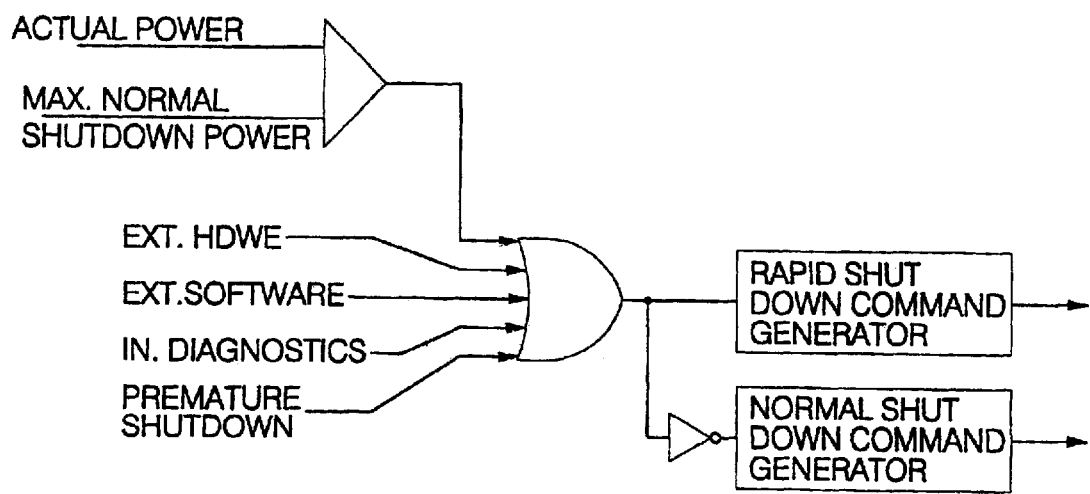
FIG. 2A is a flow diagram depicting an exemplary generation of normal and rapid shutdown commands by an onboard vehicle system.

The controller 150 shown in FIG. 1, which may be implemented by way of non-limiting example in the BPM 71 and/or the EECM 70, monitors the operation of the fuel cell system with respect to pressures, temperatures, start-up times, cycles, etc. and routinely generates shutdown commands in response to selected transition conditions of the system for transmittal to algorithm logic (see FIG. 2A).

The system shutdown control according to the present invention may be implemented in either hardware or software. Preferably, the control is implemented in software as part of the control program on the controller 150. FIG. 2A is an exemplary representation of control as a logic circuit, as disclosed in U.S. patent application Ser. No. 09/345,139 now U.S. Pat. No. 6,159,626, [H-204426] [GMFC-4426] co-owned with the present application by the assignee of the present application. The logic in FIG. 2A examines each shutdown command signal received from controller 150 and makes a determination or differentiation with respect to whether the shutdown command should be viewed as a rapid shutdown command or a normal shutdown command. The differentiation involves examining criteria which are briefly illustrated in FIG. 2A, and which are described in detail in the co-pending application referred to above. The details of the rapid shutdown command decision and signal generation are not critical to the present invention, whose staged venting methodology and vent valving arrangements are capable of use with many different forms of rapid shutdown command schemes.

Rapid shutdown is significantly shorter in duration than normal shutdown. In the event of a rapid shutdown, standard automotive bypass valving 31, 32 of FIG. 1 cannot provide the desired response time without expensive modification. Automotive type bypass valves 31 and 32 are relatively small and move slowly to the bypass position (for example, one to five seconds). One way to provide for a rapid shutoff would be to increase the size and speed of valves 31 and 32. If valves 31 and 32 are electric valves, faster valve operation would require a larger solenoid actuator. If valves 31 and 32 are pneumatic valves, faster valve operation would require larger diaphragm actuators. In both cases, however, the substitution of larger, more expensive valves is simply not practical for high volume automotive applications. And larger valves may require more electric power or air pressure than is readily available on a given vehicle.

In addition to consideration of the speed at which the bypass valves act in a rapid shutdown situation, care must always be taken to avoid degradation the fuel cell stack, since carbon monoxide concentration tends to increase during shutdown.

Also, the relatively delicate membranes in the stack cannot tolerate significant pressure differentials between the cathode and anode gases for prolonged periods, for example more than five seconds. It would be preferable to avoid any significant pressure differential across the stack during the typical one to five second operating period of bypass valving such as 31 and 32.

Figure 7:
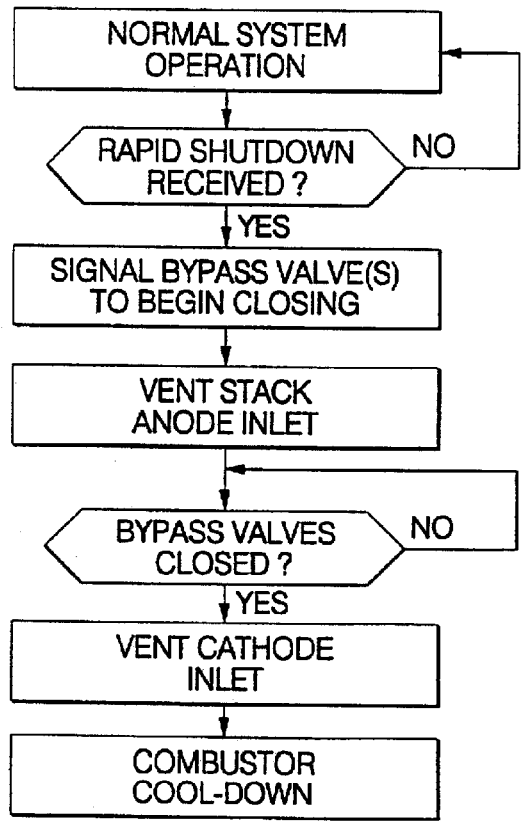
FIG. 7 is a flow diagram representation of the venting methodology illustrated by the valve positions in FIGS. 3–6.
Figure 8:
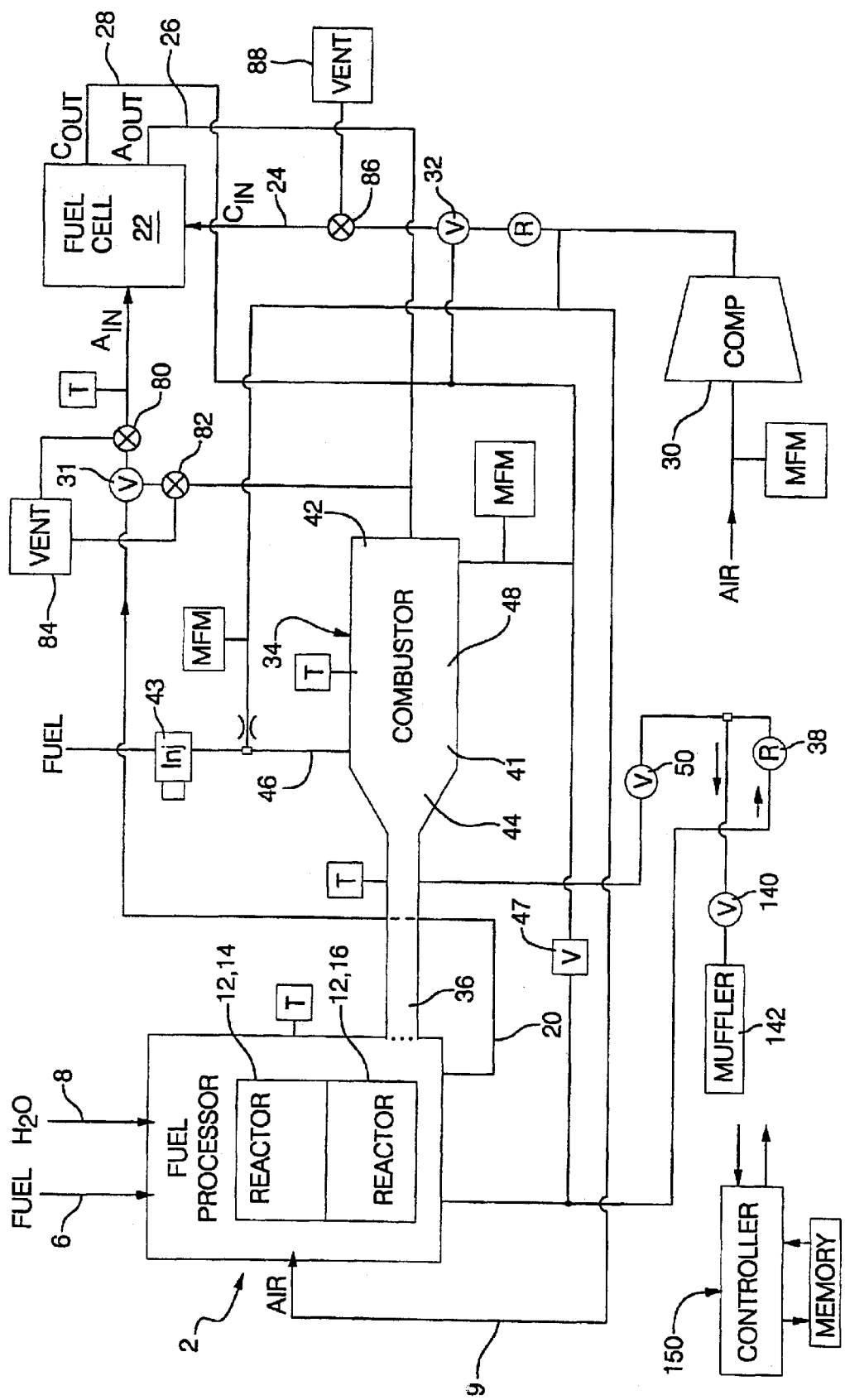
FIG. 8 illustrates the fuel cell system of FIG. 1 with vent valving added to carry out the staged venting methodology of the present invention.

FIGS. 3–6 illustrate a preferred embodiment of the invention methodology and preferred venting apparatus for use with a system such as that illustrated in FIG. 1. It will be understood that FIGS. 3–6 are simplified illustrations based on the system shown in FIG. 1. FIG. 7 is a flow diagram representation of the venting methodology illustrated by the valve positions in FIGS. 3–6. FIG. 8 illustrates the fuel cell system of FIG. 1 with vent valving added to carry out the staged venting methodology of the present invention. FIG. 6A illustrates an alternate embodiment of the system of FIGS. 3–6, which assumes a pressure-resistant fuel cell stack. The invention allows for rapid shutdown of the fuel cell system using standard, slow-acting automotive bypass valves 31 and 32, while providing adequate cooling air to the combustor during shutdown and protecting the fuel cell 22 from carbon monoxide degradation and prolonged pressure differentials.

Figure 3:
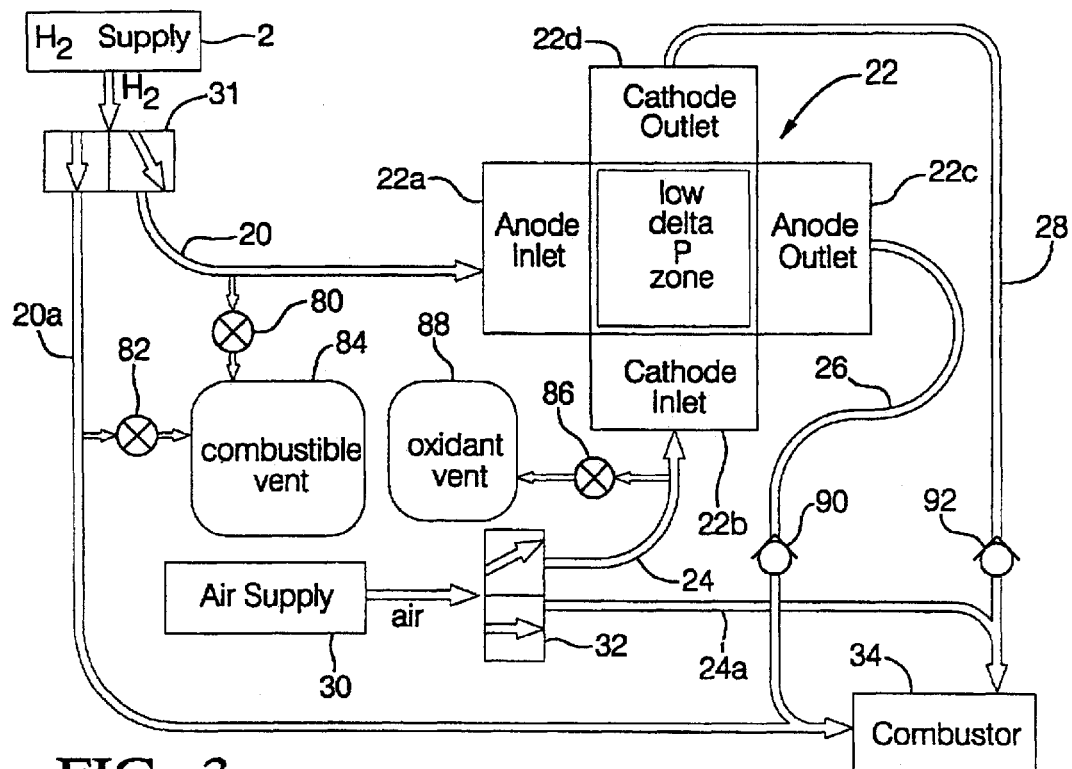
FIG. 3 is a simplified, idealized gas flow and venting representation of the fuel cell system of FIG. 1 provided with a venting arrangement according to the present invention, in a normal operating (i.e., non-shutdown) mode.

In FIG. 3, a fuel cell system according to the invention is shown prior to a rapid shutdown. The fuel cell system illustration of FIG. 3 is a simplified version of that shown in FIG. 1, emphasizing gas flows, valve operation, and additional vent valving for carrying out the invention. The additional vent valving is shown as vent valve 80 in the line or path 20 supplying $H_2$ from supply 2 through bypass valve 31 to anode inlet 22a; vent valve 82 in the line or path supplying $H_2$ from supply 2 through bypass valve 31 to combustor 34; a combustible vent 84 which receives vented $H_2$ from vent valves 80 and 82; a vent valve 86 in the line or path 24 supplying air from supply 30 through bypass valve 32 to the cathode inlet 22b; and, oxidant vent 88 for receiving air vented from vent valve 86. Optional check valving 90, 92 can be provided between the anode outlet 22c and the cathode outlet 22d and the combustor to prevent backflow in the flow paths.

In a preferred form vent valves 80, 82 and 86 are fast-acting solenoid vents. Combustible vent 84 and oxidant vent 88 may simply discharge to atmosphere, and are kept separate to avoid creating a combustible mixture of $H_2$ and air in the system during the venting process.

It will be understood that although vent valves 80, 82 and 86 are fast-acting, nearly instantaneous-opening valves, their simple one-way nature allows them to be smaller than the more complicated, multi-path bypass valves 31 and 32. The new vent valving accordingly does not place a significant burden in terms of power consumption or size on the fuel cell system, or on any related vehicle system.

It will also be understood that although vents 84 and 88 are preferably simple discharges to atmosphere, they may take other forms such as, but not limited to, holding tanks, adsorber beds, and other known devices for storing or handling gas flows.

Figure 4:
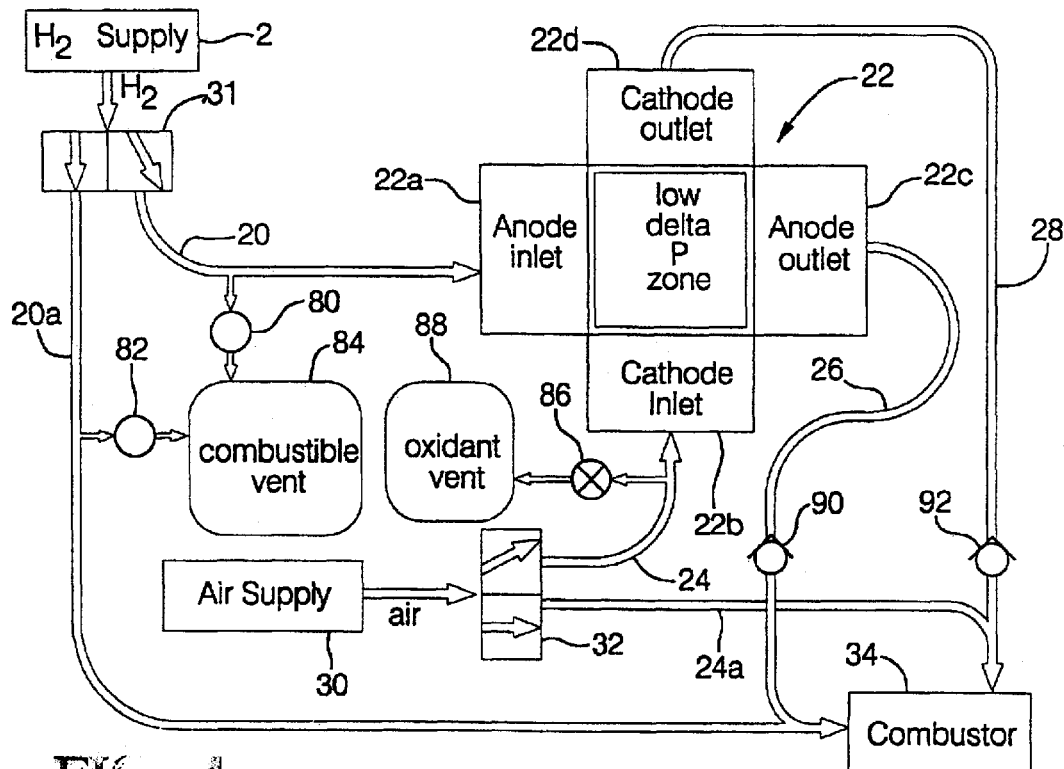
FIG. 4 illustrates the fuel cell system of FIG. 3 in a first stage of a rapid shutdown mode in which the bypass valves are just beginning to close.

FIG. 4 represents the fuel cell system according to the invention just after controller 150 has determined the need for a rapid shutdown and sent appropriate control signals to the fuel cell system. Both valves 31 and 32 are commanded to "bypass" fuel cell 22, and begin closing over their predetermined time period. Just prior to or simultaneously therewith, the anode vent solenoids 80 and 82 are commanded to open, and they do so in a manner which can be considered instantaneous as compared to the closing time of bypass valves 31 and 32. The open position is illustrated in FIG. 4 by the open circles representing the location of vent valves 80 and 82.

Figure 5:
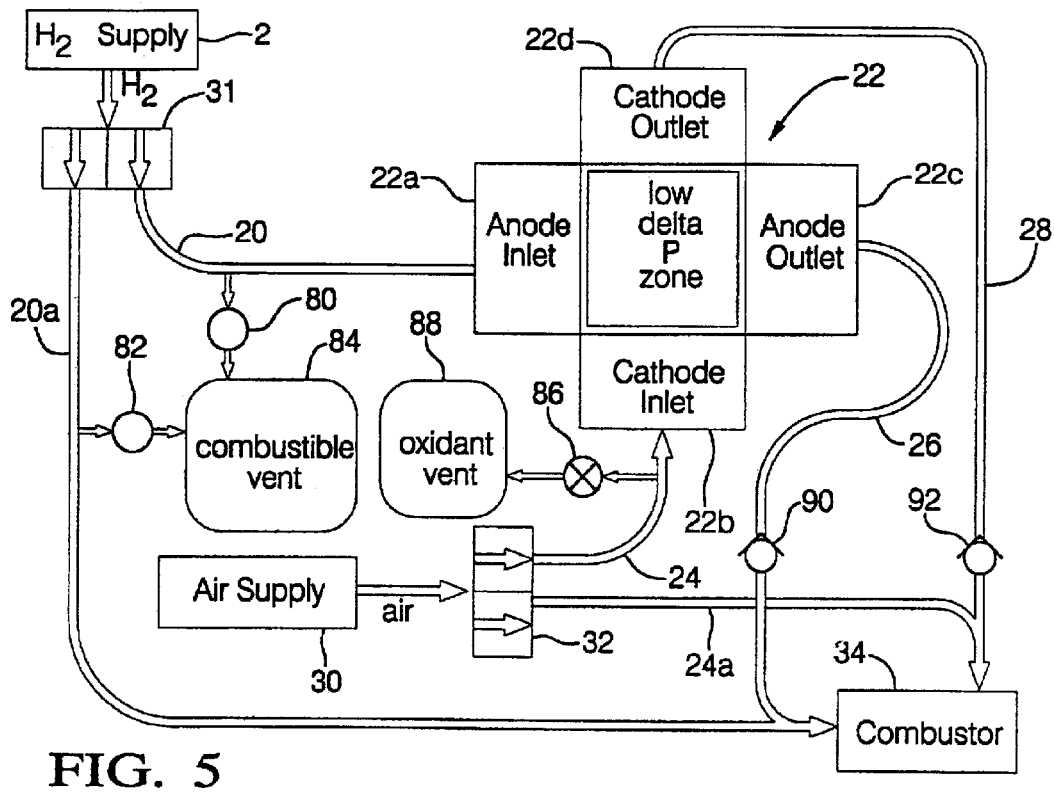
FIG. 5 illustrates the fuel cell system of FIG. 3 in an intermediate stage of rapid shutdown, in which the bypass valves are partially closed.

In FIG. 5, bypass valves 31 and 32 have partially closed, and anode vents 80 and 82 have already vented hydrogen completely from the anode inlet 22a. Cathode inlet vent 86 remains closed. Air continues to flow to combustor 34 through fuel cell 22 via cathode inlet 22b, cathode outlet 22d, and path 28. At this point the anode side of fuel cell 22 is near barometric pressure, but the cathode side of the fuel cell is at the relatively high pressure of the air supply. Since this condition has lasted less than five seconds, the pressure differential has not been prolonged enough to degrade the membranes in the fuel cell stack.

Figure 6:
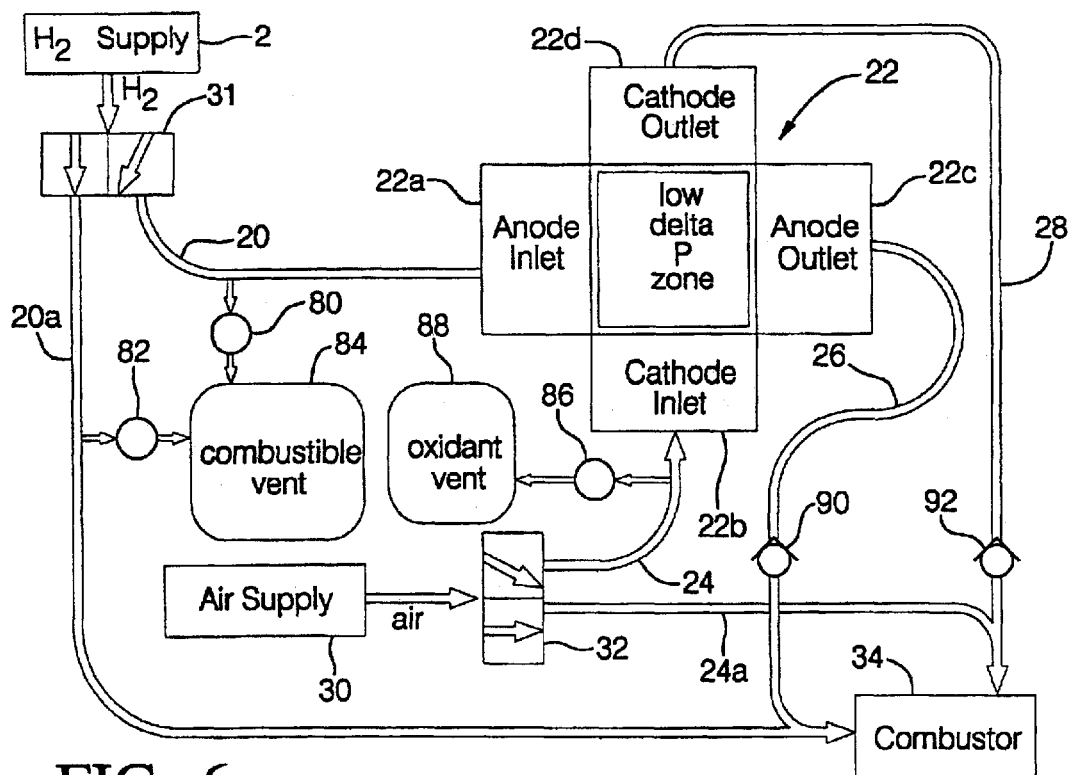
FIG. 6 illustrates the fuel cell system of FIG. 3, in which the bypass valves are near-closed or fully closed.
Figure 6A:
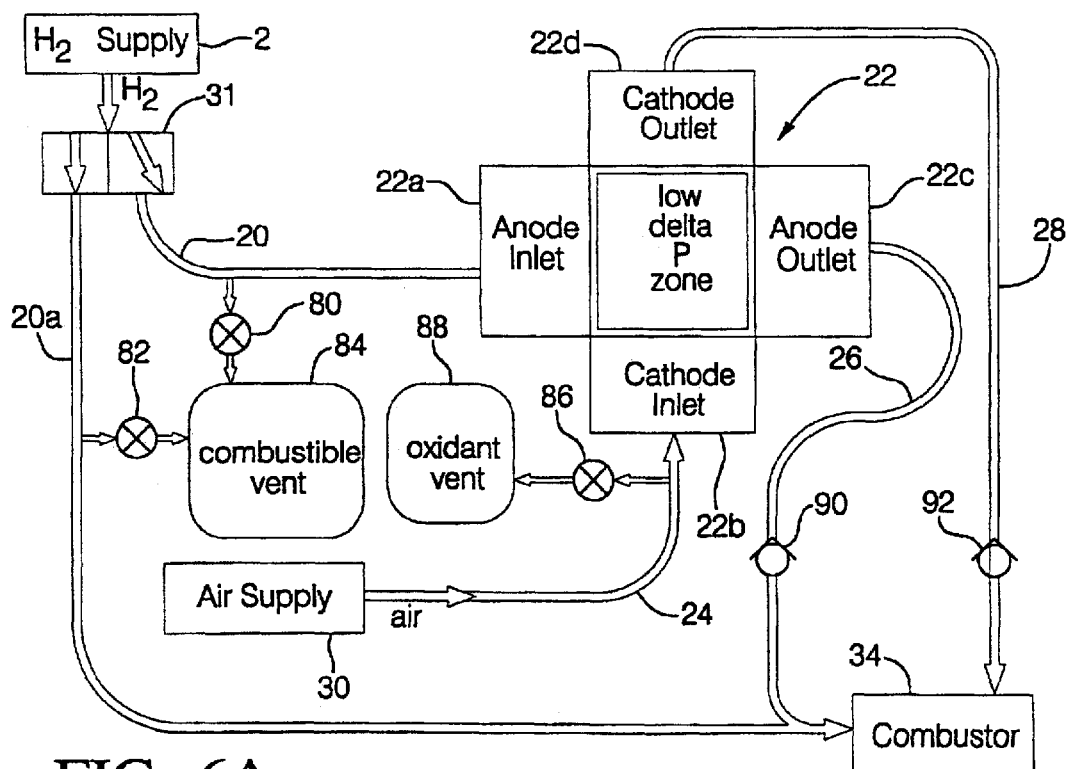
FIG. 6A illustrates an alternate embodiment of the system of FIGS. 3–6, which assumes a pressure-resistant fuel cell stack.

In FIG. 6, bypass valves 31 and 32 are completely closed, i.e. they have completely diverted $H_2$ and air from fuel cell stack 22 and now are open only to combustor 34 through lines 20a and 24a, respectively. Shortly before or simultaneous with the closing of cathode bypass valve 32 has closed, cathode inlet vent valve 86 is commanded to open and instantaneously vents the accumulated air pressure on the cathode side of the fuel cell stack to oxidant vent 88. This eliminates the pressure differential across the fuel cell stack, protecting the membranes from rupture.

The methodology of staged venting just described in reference to FIGS. 3–6 is illustrated in step-by-step flowchart form in FIG. 7.

During the rapid shutdown, combustor 34 receives sufficient airflow to first prevent overheating as it burns off residual $H_2$, and then to cool down once all residual $H_2$ is combusted. In general vent valve 86 must remain closed until the cathode bypass valve 32 is nearly or fully closed, otherwise it would sap or draw cooling air away from combustor 34.

The opening of cathode inlet vent 86 not only rids the stack of pressure differential, but in case a membrane in the stack ruptures, it vents $H_2$ or "breakthrough" methanol from the stack away from the combustor.

Depending on combustor operation during normal run mode of the fuel cell apparatus, the flow of cooling air to the combustor during shutdown may actually increase with the foregoing invention. For example, the cathode/combustor airflow ratio during run mode may be 100/0 or 80/20. As cathode bypass valve 32 begins to close during a rapid shutdown, this ratio will gradually shift: 80/20; 50/50; 20/80; until, finally, it reaches 0/100, at which point the stack is bypassed by the air supply and the combustor is receiving all of the air produced by the air supply for residual combustion and cooling.

The foregoing invention takes advantage of the ability of the fuel cell stack membranes to tolerate a short period of relatively high pressure differential at the cathode in order to ensure sufficient cooling air to combustor 34 during a rapid shutdown. However, as fuel cell development advances, and as systems capable of better withstanding pressure or operating under lower pressures are introduced, it may be possible to utilize the invention without cathode bypass valve 32 and bypass pathway 24. Referring now to FIG. 6A, a fuel cell system similar to that shown in FIGS. 3–6 is illustrated, and assumes a fuel cell stack capable of handling cathode air flow without anode gas flow. The system of FIG. 6A also assumes a membrane capable of withstanding a prolonged pressure differential, and resistant to the membrane drying which occurs with continued air flow when there is no electrical demand on the stack. Assuming such a fuel cell, the staged venting methodology of the invention is still important to the fuel cell apparatus in order to 1) maintain sufficient cooling air to combustor 34; and 2) vent the cathode side of the fuel cell if stack membrane degradation occurs, thereby venting hydrogen leaked to the cathode side and preventing air from being leaked to the anode side. In such an arrangement the ($H_2$) cathode vent valve 86 remains closed until all of the fuel is vented or burned from the system, and then the cathode side of the stack is vented to vent 88. After venting, cathode vent valve 86 is closed for the long duration cooldown of the combustor and fuel processor.

It will be understood from the foregoing examples of the invention methodology and apparatus that a particular method and valving arrangement is illustrated for one exemplary fuel cell system. The specific valving arrangement, location of valves, types of valves and vents used, the relative speeds of the valving and their closing function relative to one another may vary depending on the fuel cell apparatus to which the invention is applied. Such variations and modifications can be made by those skilled in the art without undue experimentation now that we have disclosed our invention in the embodiment above. Nothing in the foregoing description is intended to limit the invention beyond the scope of the following claims.

What is claimed is:

1. In a fuel cell system comprising a fuel cell stack having anode and cathode inlets and outlets, a combustor, an $H_2$ supply in gas flow communication with the anode inlet and the combustor, and an air supply in gas flow communication with the cathode inlet and combustor, wherein the combustor relies primarily on the air supply for cooling airflow, a venting system for rapidly shutting down the fuel cell system comprising:

an anode bypass valve selectively providing gas flow communication between the $H_2$ supply and the anode inlet and combustor, the anode bypass valve having a relatively slow speed of operation in which it bypasses the anode inlet over a predetermined time period;

a first instantaneous anode vent;

a second instantaneous $H_2$ supply vent;

a third instantaneous cathode inlet vent; and, a controller for activating the first and second instantaneous vents and the anode bypass valve in response to a rapid shutdown of the fuel cell system, and for activating the third instantaneous vent at approximately the end of the predetermined time period.

2. The system of claim 1, further including a cathode bypass valve selectively providing gas flow communication between the air supply and the cathode inlet and combustor, and further wherein the controller activates the cathode bypass valve in response to the rapid shutdown command.

* * * * *